United States Patent [19]

Schwarz

[11] 4,439,490

[45] Mar. 27, 1984

[54] EXPANDABLE POLYMERIC STYRENE PARTICLES

[75] Inventor: Richard A. Schwarz, Big Spring, Tex.

[73] Assignee: Cosden Technology, Inc., Dallas, Tex.

[21] Appl. No.: 544,919

[22] Filed: Oct. 24, 1983

Related U.S. Application Data

[62] Division of Ser. No. 483,406, Apr. 8, 1983, Pat. No. 4,429,058.

[51] Int. Cl.$^3$ .............................................. C08J 9/22
[52] U.S. Cl. ..................................... 428/407; 521/57; 521/88; 521/97; 521/60; 521/56
[58] Field of Search .................... 428/407; 521/57, 88, 521/97, 60, 56

[56] References Cited

U.S. PATENT DOCUMENTS

| | | | |
|---|---|---|---|
| 436,165 | 11/1882 | Mostofa | 521/57 |
| 3,789,028 | 1/1974 | Heiskel | 521/57 |
| 4,238,570 | 12/1980 | Shibata et al. | 521/57 |
| 4,304,796 | 12/1981 | Spicuzza, Jr. et al. | 521/57 |
| 4,312,957 | 1/1982 | Spicuzza, Jr. | 521/57 |
| 4,369,227 | 1/1983 | Hahn et al. | 521/57 |

*Primary Examiner*—Morton Foelak
*Attorney, Agent, or Firm*—Russell H. Schlattman; M. Norwood Cheairs

[57] ABSTRACT

An improved expandable polymeric styrene particle is provided containing a blowing agent, a minor amount of pentaerythritol tetrastearate, overcoated with a minor amount of glyceryl monostearate. The improved particle results in a significantly reduced final mold cooling cycle in producing the finished molded article. Pentaerythritol tetrastearate is preferably incorporated during impregnation with the blowing agent and glyceryl monostearate overcoated by blending with the expandable particles after impregnation.

3 Claims, No Drawings

EXPANDABLE POLYMERIC STYRENE PARTICLES

CROSS REFERENCE TO RELATED APPLICATIONS

This application is a divisional of a prior copending application, Ser. No. 483,406, filed Apr. 8, 1983 U.S. Pat. No. 4,429,058 issued Jan. 31, 1984 by Richard A. Schwarz for "Expandable Polymeric Styrene Particles".

TECHNICAL FIELD

This invention relates to expandable or foamable polymeric styrene particles, such as expandable polystyrene particles. More particularly, this invention relates to such expandable particles having increased utility in the manufacture of foamed articles by reducing the final mold cooling cycle.

BACKGROUND OF THE INVENTION

Expandable polymeric styrene particles and the articles produced from such particles are well known in the art. Such articles include insulated building panels, decorative display objects, novelties, cushioning materials, floatation devices, hot or cold beverage containers, portable ice or cooling chests or boxes, etc. The principal utilitarian characteristics of such foamed articles are their light weight and good heat insulation qualities.

The expandable polymeric particles are generally prepared by impregnating the particles with from 1% to 20% by weight of a suitable expanding or blowing agent such as pentane. In producing the foamed articles, the impregnated particles, or beads, are first subjected to a pre-expansion step wherein the beads are heated with steam in an unconfined space to produce a prepuff having a relatively low density. The prepuffed beads are then placed into the desired confined mold and final expansion accomplished with the further introduction of steam, followed by cooling and removal of the molded article.

In evaluating the utility of a particular expandable polymeric styrene particle in producing the desired foamed article, consideration must be given to the final mold cooling cycle as it affects the rate, and consequently the cost, of the production of the finished product.

SUMMARY OF THE INVENTION

It has now been found that an expandable polymeric styrene particle having incorporated therein a blowing agent and a minor amount of pentaerythritol tetrastearate (PETS) and overcoated with a minor amount of finely divided glyceryl monostearate (GMS) significantly reduces the final mold cooling cycle in producing the finished molded article.

DESCRIPTION OF A PREFERRED EMBODIMENT

To a kettle equipped with an agitator was charged 100 parts by weight of water, 2 parts by weight of tricalcium phosphate, 0.05 parts by weight of sodium dodecylbenzene sulfonate, 100 parts by weight of polystyrene beads having a bead diameter of about 1 mm. and 8.0 parts by weight of n-pentane. In the examples which follow, PETS was also charged at this point in the amounts indicated.

The kettle was heated to a temperature of 215°–230° F. (102°–110° C.) and maintained within this temperature range for 7–10 hours with agitation. The kettle was then cooled to room temperature, the contents acidified with nitric acid, the beads separated from the aqueous medium, washed with water and air dried at room temperature.

The dried beads containing the n-pentane and PETS were then placed in a ribbon blender with finely divided GMS (90% passing a 425 mesh screen) being added in the amount indicated. The mixture was blended for approximately 15 minutes.

For pre-expansion, the beads were placed in a kettle equipped with agitators and means for passing steam through the beads. Prepuffs were formed by passing steam at 5 psig (34 kPa) through the beads for approximately 2 minutes. The prepuff particles had a diameter of approximately 3/16 inch (5 mm.).

To test the qualities and characteristics of the finished molded foamed article, an ice chest mold was employed. The ice chest was rectangular in cross section being approximately 30 cm. high with a wall thickness of approximately 2.5 cm. The rectangular top measured approximately 30 cm.×39 cm. The ice chest tapered to a rectangular bottom which measured approximately 26 cm.×35 cm. The mold was jacketed to permit steam injection into the contents of the mold. The mold was partially filled with prepuffs, closed and steam passed through the mold at 220° F. (104° C.) for sufficient time to form the molded article. The molded article was then allowed to cool until capable of removal from the mold.

Samples of molded foamed articles were prepared using the above procedure, with and without the incorporation of PETS and GMS. The following examples illustrate the comparative results.

EXAMPLES

| Example No. | Additive | Mold Cooling Cycle |
|---|---|---|
| 1 | None | 220–240 sec. |
| 2 | 0.25% PETS | 180–200 sec. |
| 3 | 0.25% PETS and 0.2% GMS | 150–170 sec. |

The cooling cycle for the finished molded foam article was measured by the time required from steam shut off in the final molding, using steam at 15 psig (103 kPa), to the permissible removal of the article from the mold.

Comparing the results of Examples 1 and 2 with the results of Example 3, clearly illustrates the effect of the additives of this invention.

The improved characteristics of expandable polymeric styrene particles discussed herein are realized by incorporating only minor amounts of PETS and GMS onto the polymeric styrene particles. Expandable polymeric styrene particles containing from about 0.025%% to about 1.0% of PETS and from about 0.04% to about 0.4% of GMS, both by weight of polymeric styrene, and particularly useful. In accordance with the preferred embodiment of this invention, the PETS is preferably incorporated into the polymeric styrene particle during the incorporation of the blowing agent. However, advantageous results are also accomplished by external blending of the PETS with expandable polymeric styrene particles after first incorporating the blowing agent. This can be carried out by tumbling or ribbon blending dried expandable polymeric styrene particles with the desired quantity of PETS.

According to this invention, the GMS is incorporated onto the polymeric styrene particles following the incorporation of the PETS. This provides an overcoat of GMS on the polymeric styrene particles incorporation of the GMS onto the polymeric styrene particles is best accomplished by external blending, such as by tumbling or ribbon blending of the GMS with polymeric styrene particles having PETS incorporated onto the polymeric styrene particle.

The GMS employed in the practice of this invention should be in finely divided or micronized form. Preferably the GMS particle size should be such that 90% will pass a 425 mesh screen.

The invention has been described herein with particular regard to expandable polystyrene particles having incorporated therein a minor amount of the additives of this invention. In its applicability, the invention is not limited to polystyrene as other vinyl aromatic polymers can be employed. These include polymers derived from such vinyl aromatic monomers as vinyl toluene, isopropylstryene, alpha-methylstyrene, chlorostyrene, tert.-butylstyrene as well as to copolymers of vinyl aromatic monomers and butadiene, alkyl acrylates, acrylonitrile, etc. As used in the specification and claims the expression "polymeric styrene particles" is meant to include particles of all such polymers and copolymers.

The invention has been described herein using pentane as the blowing agent. The invention is not limited to the use of pentane as other blowing agents can be employed. Suitable blowing agents include butane, isopentane, cyclopentane, hexane, heptane, cyclohexane and the lower boiling halogenated hydrocarbons. Mixtures of the various mentioned blowing agents can also be employed. Expandable polymeric styrene particles usually contain from 1 to 20% by weight of the blowing agent. Impregnation with the blowing agent to produce expandable polymeric styrene particles can be carried out over a wide temperature range, namely, at temperatures ranging from about 140° (60° C.) to about 302° F. (150° C.).

What is claimed is:

1. An expandable polymeric styrene particle having incorporated therein a blowing agent, 0.025% to about 1.0% by weight of pentaerythritol tetrastearate and an overcoat of 0.04% to about 0.4% of finely divided glyceryl monostearate.

2. The particle of claim 1 wherein the polymeric styrene is polystyrene.

3. The particle of claim 2 wherein the blowing agent is pentane.

* * * * *